United States Patent [19]
Kuhn

[11] Patent Number: 5,184,641
[45] Date of Patent: Feb. 9, 1993

[54] FLOW REGULATOR

[76] Inventor: Dieter Kuhn, Krauskopfallee 39, D-6229 Georgenborn, Fed. Rep. of Germany

[21] Appl. No.: 757,682

[22] Filed: Sep. 11, 1991

[30] Foreign Application Priority Data
Sep. 14, 1990 [DE] Fed. Rep. of Germany ....... 4029183

[51] Int. Cl.$^5$ .............................................. G05D 7/01
[52] U.S. Cl. .................... 137/504; 138/41; 138/45
[58] Field of Search ...................... 137/504; 138/41, 45

[56] References Cited
U.S. PATENT DOCUMENTS

| | | | |
|---|---|---|---|
| 2,936,788 | 5/1960 | Dahl | 138/45 |
| 3,630,444 | 12/1971 | Nelson | 137/504 X |
| 4,266,576 | 5/1981 | Bradford | 138/45 X |

Primary Examiner—Robert G. Nilson
Attorney, Agent, or Firm—Biebel & French

[57] ABSTRACT

The invention relates to a flow regulator for gaseous or liquid media, comprising a housing (1), a regulating unit (1) which changes its free flow area, depending on the flow pressure of the medium, and further comprising a distributor unit (3) behind the regulating means (2) in the direction of flow. To provide a flow regulator which is still relatively simple in construction yet enables more constant volume limitation to be maintained and is less sensitive to manufacturing tolerances of the individual components, the invention proposes that a disc (4) containing at least one hole (5) be provided between the regulating unit (2) and the distributor unit (3) and be movable to a limited extent in an axial direction at least in the region of the hole.

18 Claims, 4 Drawing Sheets

FLOW REGULATOR

BACKGROUND OF THE INVENTION

The invention relates to a flow regulator for gaseous or liquid media, comprising a housing, a regulating unit which changes its free-flow area, depending on the flow of the medium, and further comprising a distributor unit. The regulating unit may, for example, be a component which partly limits the flow area, which is mounted for spring-like movement in an axial direction, and which reduces the flow area as the pressure increases, by axial displacement in a tapered part of the housing.

In the simplest case the distributor means is a disc containing a plurality of small, evenly distributed holes, from which the medium emerges suitably divided into individual fine jets. For the sake of simplicity only water will be considered as the flowing medium here; however, the invention is not restricted to water, and corresponding statements may readily be applied to other flowing media, particularly gaseous substances.

Flow regulators of this type are often used on water taps to reduce water consumption or to keep it at a low level. In a flow regulator for water taps the distributor means mostly comprises a perforated disc of the type described above, and a group of coarse and fine screens spaced therefrom in the direction of flow. Apertures are provided in the wall of the housing surrounding the whole arrangement, between the distributor disc and the screens, and air is drawn through the apertures and mixed in with the water flowing through the regulator. The water then emerges from the screen arrangement suitably finely divided and mixed with air. Arrangements of this type with a distributor means, air suction apertures and a screen arrangement are also described as "aerating taps". However, most aerating taps do not have a regulating device.

So-called water-saving regulators or water-saving inserts are also known. Substantially the only difference between them and the aerating taps is that they have an additional flow limiter, which may be identical with the distributor disc, so that the whole free flow area, independently of pressure, is always smaller than in conventional taps with a bubbling effect. The flow volume is therefore reduced by substantially the same percentage as compared with conventional taps over the whole pressure range. These "water-saving regulators" do not generally have a regulating element as understood in the invention, where the flow area changes depending on the flow pressure, that is to say, becomes smaller as the flow pressure rises. The last-mentioned flow regulators are an attempt to obtain the most constant possible flow volume independently of the flow pressure.

Efforts are often made to set the volume flow rate through the regulator as far as possible at a very low pressure, and to hold the flow rate constant over the largest possible pressure range as the pressure rises. Efforts are also generally made to keep the whole construction of the regulator as simple as possible, so that it is easy and cost-effective to produce.

A flow regulator with the above-mentioned features is already known, in which the regulating means has a very simple structure. It comprises a substantially conical, flexible plastics element, in which slots extend radially from near the center, outwardly to the edge of the once but end before the outer edge of the regulating element. The slots may start from a central flow aperture in the cone. A regulating means of this type is mounted in the flow regulator with the conically converging end in the opposite direction to the flow, so that the individual segments into which the cone is divided by the slots are pushed axially and radially inwards by the pressure exerted on them. The slots between the segment are closed and the diameter of any central aperture provided becomes smaller, until all the segments lie firmly against each other and the cross section eventually does not change any more even if the pressure continues to rise.

With a simple regulating arrangement of this type it has already been found possible to keep the flow volume substantially constant over a pressure range from about 1 to 10 bar i flow regulators for water.

However, it is very difficult to stipulate the exact flow volume precisely owing to the manufacturing tolerances for the various components. In practice there are variations in the maximum volume flowing through within the regulating range (which may e.g. be from 1 to 10 bar) which have variations in the region of 10% and even more, in regulating means of substantially identical construction.

Nor does the curve for the flow volume per unit of time, plotted against the flow pressure, show an exactly constant value; it usually passes through a more or less pronounced maximum in the 2 to 3 bar flow pressure region.

At this state of the art the problem underlying the invention is to provide a flow regulator with the above-mentioned features, which is still relatively simple in construction yet enables more constant volume limitation to be maintained and is less sensitive to manufacturing tolerances of the individual components.

SUMMARY OF THE INVENTION

The above fluid flow regulating problem is solved by providing a disc containing at least one hole and placing it behind the regulating unit in the direction of flow, i.e. between the regulating unit and the distributor unit in such a manner that it can be moved to a limited extent in an axial direction at least in the region of the hole.

Clearly a disc of this type virtually constitutes a further flow restriction. Yet the size of the hole in the disc is selected so that the required volume nevertheless flows through the regulator within the regulating range.

However, the axial mobility of the disc, at least in the region of the hole, means that the required volume, surprisingly, can be kept more constant over a wide pressure range, and that the variations resulting from manufacture, which have otherwise arisen in such flow regulators not incorporating a perforated disc, are significantly reduced.

The basic mode of operation of the perforated disc is not completely clear. However, it appears that when pressure is applied to the regulator the full pressure is first exerted on the disc, because the regulator is normally already full of flow medium. The perforated disc yields in an axial direction, leading to pressure relief in the space between the regulating means and the disc. The pressure differential dropping over the regulating means thus becomes greater and ensures that the regulator responds quickly, so that the pressure acting on the perforated disc drops again and the disc moves back again in an axial direction or spring back resiliently. This again leads to a slight rise in pressure in the region between the control means and the perforated disc, so that the pressure differential over the regulating means is reduced and the regulating means opens correspondingly wider, whereupon the process just described recommences. The process does in fact take place very rapidly, so that a slight vibration can be observed, i.e. rapid axial to-and-fro movements of the disc. The effect that this reciprocal action of the disc and regulating means has on the dynamic flow conditions is that the above-mentioned advantages are obtained, via a more constant flow volume within the regulating range and smaller tolerance variations of the flow volume.

The addition of one perforated disc does not make the construction significantly more complex, and the increase in the cost of making such a flow regulator is negligible. In any case the advantages obtained by far offset the price disadvantages, which are in the range of 0.1% at the most.

In the preferred embodiment of the invention a projection extending in the direction of the hole or holes in the disc is arranged behind the hole in the direction of the flow, and the distance from the projection to the surface of the perforated disc facing it, when the disc is moved to the maximum in the direction of the flow, is shorter than the radius of the hole. The projection then restricts the flow through the hole, at least in the position with the whole region moved to the maximum in an axial direction, thus initiating vibration of the disc still more easily.

However, the mode of operation described is only a model illustration and it does not matter ultimately whether the movements of the disc are actually produced by the pressure conditions described. Consequently it is sufficient to know the actual means whereby the required effects are obtained.

The projection is appropriately a pin located on the upstream distributor means. In the preferred embodiment of the invention the distributor means has a distributor disc containing flow appertures which are distributed substantially evenly over its surface.

The distributor disc ensures that the water (or flow medium), flowing e.g. out of only one or a few holes in the disc, is distributed evenly over the whole cross section of the regulator or the internal cross section of the housing.

In the preferred embodiment of the invention the distributor means further comprises the already-mentioned distributor disc and additional coarse and/or fine screens arranged at spaced distances from the disc. The housing appropriately contains apertures between the distributor disc and the screen arrangement.

In order to achieve the required effects, the perforated disc must clearly be at a certain minimum distance from the distributor disc. The easiest way of achieving this is to provide an axial spacer for the perforated disc on the distributor disc and an additional spacer for the screen arrangement provided at the other side of the distributor disc.

The spacer for the perforated disc is appropriately in the form of a projection from a collar, provided in the form of a cylindrical jacket at the outer edge of the distributor disc. In this way the spacer cannot affect a hole, appropriately located at the center of the perforated disc, or the flow through it. The perforated disc may of course contain a plurality of possibly smaller holes, in which case a plurality of pins, corresponding in number to the holes in the perforated disc, may be arranged on the distributor disc.

Here again the axial length of the pins should at the most be equal to the axial length of corresponding spacers or of the projection from the collar. In one embodiment of the invention the perforated disc is mounted with clearance between the distributor disc and the regulating element. This can be achieved, for example, if the cylindrical collar has two spaced projections, and if the inside diameter of the collar is slightly constricted in two stages in the direction of flow at the ledges or steps formed by the projections. The diameter of the perforated disc is then selected so that the disc slides over the first step and only comes to rest on the second step, while the selected outside diameter of the regulating element is larger, so that the regulating element comes to rest on the first step.

The diameter of the regulator may however be large enough for it to lie on the exposed end of the collar. The perforated disc is then mounted for axial movement between the said ledges or between the ledge and the end of the collar.

In another embodiment of the invention, which may however be combined with the movable mounting, the perforated disc yields resiliently to the flow pressure applied, at least in its central region which contains at least one hole. This resilient yielding of the disc, at least in the region of the hole or holes provided therein, produces exactly the effects described above. The resilience of the disc then produces the vibrating movements described above, at least in the region of the hole. Naturally the material of the perforated disc and its thickness may be selected appropriately to optimize the regulator.

Different materials or thicknesses lead to different flexibility constants and thus to different resonance frequencies in the disc, which generally vibrates at its natural frequency.

In the preferred embodiment of the invention the axial clearance or the deflection of the disc in the region of the hole should be at least 0.5 mm at the maximum flow pressure envisaged within the regulating range. Other embodiments are of course possible, in which a multi-layer perforated disc is provided or the axial movements of the perforated disc are limited by stops.

The invention has been combined particularly successfully with the known regulating element in the form of a plastics cone with slots extending radially outwards and ending before the periphery of the cone, and with the tapering end of the cone pointing in the opposite direction to the flow.

The cone appropriately has a preferably flat flange running around it, the flange lying either directly on the perforated disc or on a ledge on the collar for the distributor disc.

Other advantages, features and applications of the invention will become clear from the following description of preferred embodiments and from the appended drawings.

DESCRIPTION OF THE PREFERRED EMBODIMENTS

Figure 1:
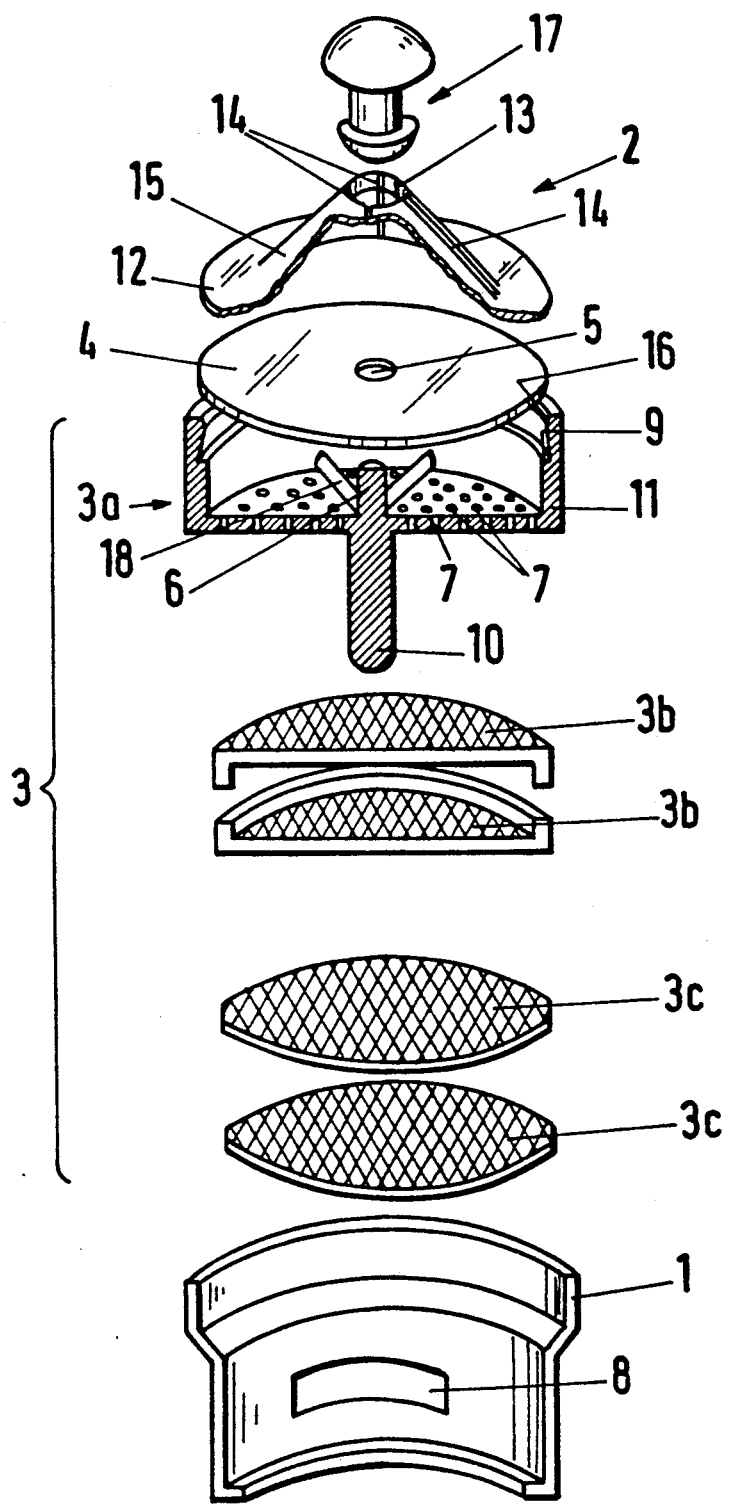
FIG. 1 is a perspective sectional view of the essential elements of a flow regulator.

In the exploded view in FIG. 1 the various components are shown, partly broken away or in section and partly in perspective. A housing 1 can be seen, made for example of plastics. The outside of it is mostly designed as an insert for a metal sleeve to be screwed onto a water tap.

The housing has a different inside diameter in the upper and lower portions. The lower, somewhat constricted portion contains the screen arrangement 3b, while the distributor disc 3a and the regulating element 2 with the perforated disc 4 are located above it. The distributor disc 3a lies on the ledge formed between the upper, large part and the lower, smaller part of the cylinder. The disc 3a comprises a flat disc containing a plurality of holes, with a substantially cylindrical collar 11 molded integrally onto its outer edge. A central post 10, molded onto the center of the distributor disc 3a, extends vertically therefrom towards the screen arrangement 3b and acts as a spacer. A pin 6, also molded onto the center of the distributor disc 3a, extends upwardly diametrically opposite the post 10 and is aligned with the hole 5 in the disc 4. The disc 4 is inserted in the collar 11 and lies on a ledge 9a formed by a step 9 inside the collar 11.

The regulating element 2 substantially comprises a cone which has a central aperture 13 at its tip and slots 14 extending radially outwards from the aperture 13 and dividing the cone into a plurality of segments 15. The outer edge of the cone becomes a flat annular flange 12 which interconnects the segments 15. The regulating means 2 is made of a flexible plastic, and the material and its wall thickness are adapted to the particular application. In the case of a regulating means for a water tap as described here, the material is selected so that, at a flow pressure of 6 to 10 bar, the individual segments 15 are pressed far enough downwards and inwards, substantially to close the intermediate slots, at least in the central area, and to make the central aperture 13 reach its minimum cross section.

If the pressure is further increased beyond the envisaged regulating range, the flow area does not initially change any further.

The central hole in the cone may be partly closed, e.g. by the plug 17 shown in FIG. 1 with a domed head at both ends. These heads fix the plug in the hole 13 in an axial direction. A plug of this type or a cap could alternatively be joined integrally with the cone 15 by resiliently yielding webs, in which case the domed heads could be dispensed with. The plug further restricts the flow to a more or less pronounced extent according to its diameter, and also acts as a stop for the inwardly moving segments.

The flange 12 on the regulating means 2 has the same outside diameter as the perforated disc 4. This diameter is about 20 mm, in line with the amount of space in conventional aerating taps.

The 5 hole in the center of the disc 4 has a diameter from about 3 to 8 mm. The diameter of the pin 6 need not necessarily be the same as that of the hole 5, but the pin 6 is arranged substantially coaxially with the hole. If the upper end of the pin comes very close to the plane formed by the bottom edge surface of the disc 4 or even passes into or through the hole 5, the diameter of the pin 6 may be considerably smaller than that of the hole 5; in this case the fins 18 at the base of the distributor disc 3a may form to stop for the axial movement of the disc 4. If the surface of the upper end of the pin 6 is always relatively far away from the plane of the bottom surface of the disc 4, a slightly larger pin diameter can be selected, possibly even larger than the diameter of the hole 5.

The axial movements of the perforated disc 4, which in the case described here are obtained through flexural variations of the central part of the disc 4, cause constant slight changes in flow resistance through the hole 5, since the water flowing through the hole 5 strikes the pin 6 immediately behind 14. Optimization is possible here, if appropriate through special shaping of the upper end of the pin 6. For example, the upper end may be hollowed out in a concave shape or curved in a convex shape, to produce different effects on the changes in flow resistance. In the embodiment illustrated the upper end of the pin 8 is flat.

Figure 2:
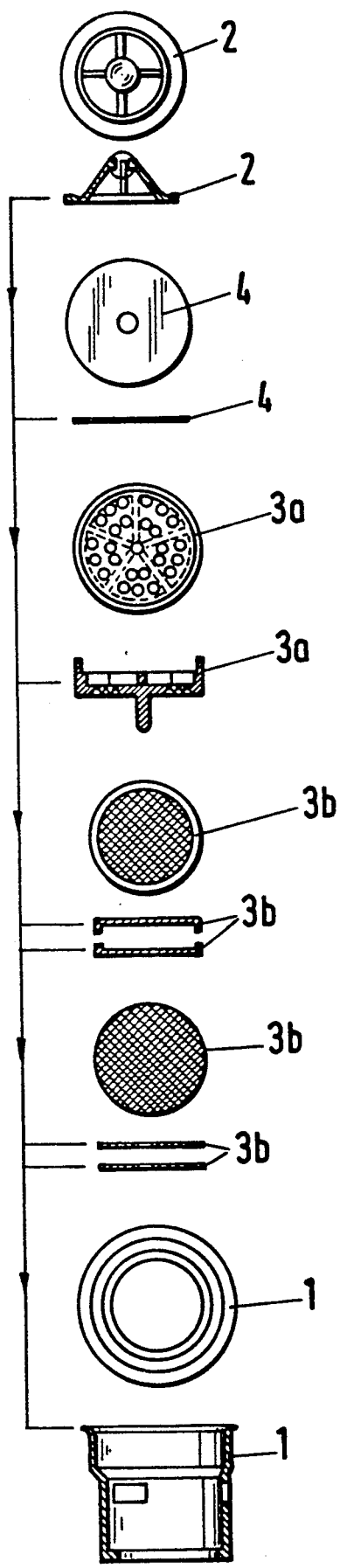
FIG. 2 contains alternate axial plan and side views of all the components of a regulator according to the invention, in the order in which they are provided.

The individual components are shown again separately in FIG. 2. Working downwards there is first the regulating element 2, then the perforated disc 4, the distributor disc 3a, two fine and two coarse screens together forming the screen arrangement 3b, and finally the housing 1 with the apertures 8. The parts listed above are shown assembled in FIG. 3a. The flange 12 of the regulating element 2 can be seen to be lying on the perforated disc 4 and clamping in onto the ledge 9 of the collar 11. For this purpose the collar 11 may appropriately have a bead at its upper inner edge, the inside diameter of the head being slightly smaller than the outside diameter of the regulating element, so that the regulating element has to overcome slight resistance when it is pressed in, and engages behind the bead. The distance between the ledge 9 and the bead at the upper inner edge of the collar 11 should be virtually the same as the total thickness of the material of the disc 4 and flange 12 (at their outer edge).

Figure 3A:
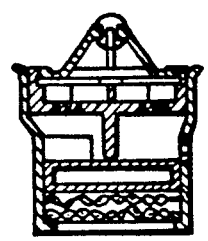
FIG. 3 is a longitudinal section through a series of different embodiments with a different screen arrangement.

It will also be seen from FIG. 3a that the post 10 acting as a spacer fixes the distance between the screen arrangement 3b and the distributor disc 3a, so that the appertures 8 in the wall of the housing 1 are located virtually in the region between the distributor disc and the screen arrangement; hence air can be drawn in here and mixed-in in the screens in the form of very fine bubbles.

As already mentioned, the embodiment in FIG. 3a corresponds exactly to the construction shown in FIG. 2 in the form of the individual components. As seen in the direction of the flow, the flow regulator thus starts with the regulating element 2, followed by the perforated disc 4, these two parts being held in the collar 11 of the distributor disc 3a. Some distance below the disc 3a there are then two fine screens with flanged edges, arranged with the flanged edges lying against each other so that the two screening surfaces are held apart. Below them there are then two coarse screens laid flat on each other and forming the actual water outlet.

Figure 3B:
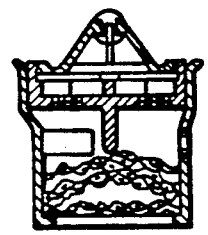
Figure 3C:
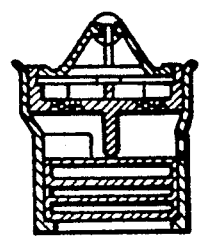

Alternative embodiments are shown in FIGS. 3b to 3f. In FIG. 3b there are two outwardly curved coarse screens superimposed with the same orientation, instead of the two fine screens, and the outlet screen is just one coarse screen. The embodiment in FIG. 3c has four superimposed fine screens with flanged edges, so that the planes of the screens are spaced apart.

Figure 3D:
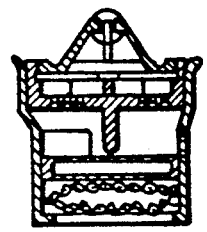

FIG. 3d shows an embodiment which is substantially the same as that in FIG. 3a, except that the upper of the two coarse screens is curved upwardly in its central area, so that it is spaced from the coarse screen below it.

Figure 3E:
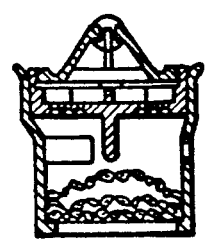
Figure 3F:
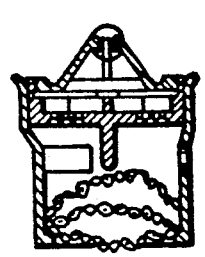

FIG. 3e shows an embodiment similar to FIG. 3b, except that only one upwardly curved coarse screen is provided instead of two, and two coarse screens lying flat on each other are again provided at the outlet. A further alternative is shown in FIG. 3f, with three superimposed curved screens, dimensioned and arranged so that the screening surfaces are not in contact in the central area.

The invention functions independently of the actual screen arrangement and can thus take any of the forms illustrated.

The housing 1 is designed so that the whole of it can be inserted in a standard sleeve which can be screwed onto or into a water tap. In certain cases the sleeves themselves may act as the housing, so that the corresponding components are inserted directly in a screwed-in or screwed-on sleeve.

The invention has provided a very simple way of producing a flow regulator, combining a simple and cost-effective construction with a very good regulating characteristic, where as the flow pressure rises the flow volume initially increases very greatly and is then kept virtually constant over a wide range of flow pressures. The flow volume regulators which have proved successful in practice are those designed for maximum flow volumes of e.g. 6 or 10 liters per minute, which keep these flow volumes constant at least over the pressure range from 2 to 6 bar, with a maximum variation of 2 to 3%.

Similar flow regulators with smaller or larger flow volumes or any intermediate values can of course be made in the same way. But owing to the flow restrictions which the other components necessarily entail, a higher nominal value is clearly achieved only if the minimum pressure is higher than that which applies when the flow volume is limited, e.g. to 5 to 6 liters per minute.

Figure 4:
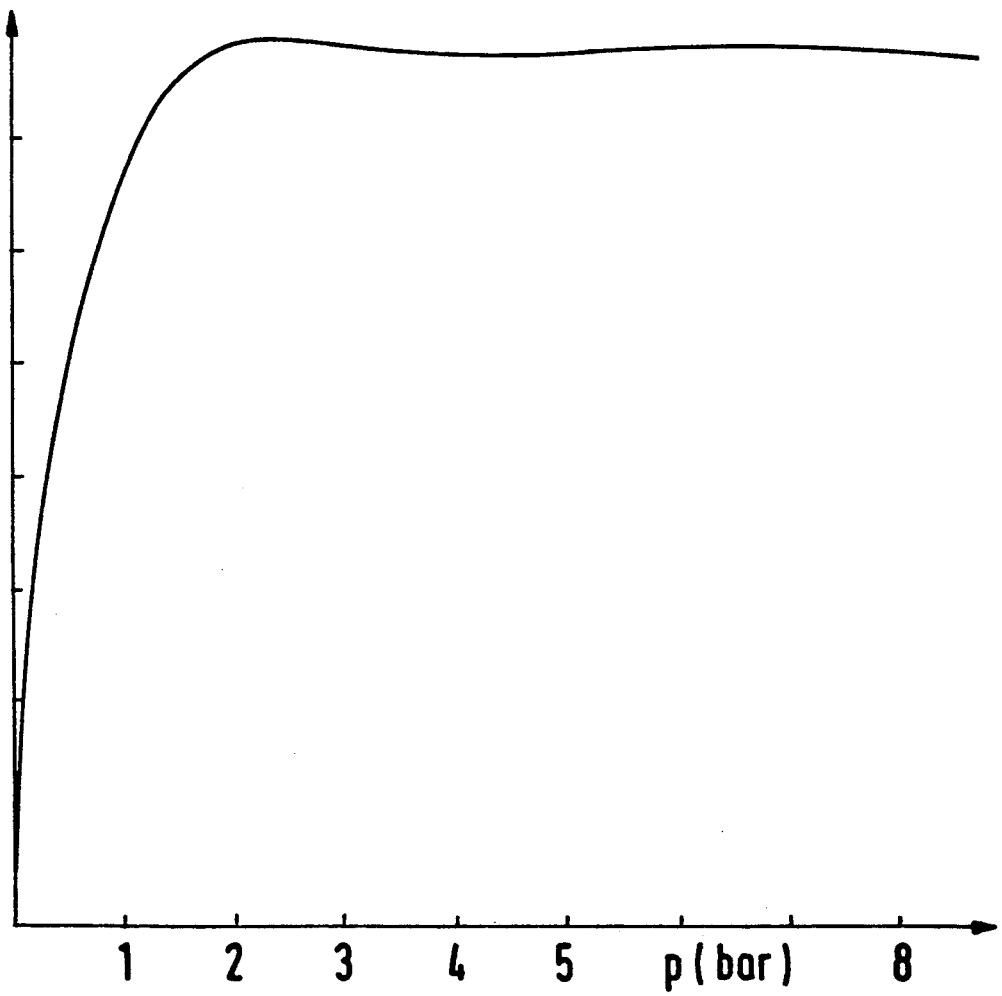
FIG. 4 is a diagram of flow volume versus set flow pressure.

FIG. 4 is a diagram showing the characteristic curve of the flow volume, measured in liters per minute, plotted against the set flow pressure.

The vibration of the perforated disc and movement of the segments of the regulating element have the advantage that furring of these components is completely avoided. The vibrations are also transmitted to the other components of the flow regulator, so these are also kept substantially free from scale. Freedom from calcification can possibly also be ensured by using low-calcifying materials.

An optimized combination of the components shown in FIG. 2 or 3 only makes slight noises when water flows through; the screen arrangements illustrated have a sound-insulating effect.

What is claimed is:

1. A flow regulator for gaseous or liquid media, comprising a housing, a regulating unit which changes its free-flow area, depending on the flow pressure of the medium, and further comprising a distributor unit behind the regulating unit in the direction of the flow, characterized in that a perforated disc containing at least one hole is provided between the regulating unit and the distributor unit and can be moved to a limited extent in an axial direction at least in the region of the hole.

2. The flow regulator of claim 1, characterized in that a projection extending in the direction of the hole in the disc is arranged behind the hole in the direction of flow, and that the distance from the projection to the surface of the perforated disc facing it, when the disc is moved to the maximum in the direction of flow, is shorter than the radius of the hole.

3. The flow regulator of claim 2, characterized in that said projection comprises a pin arranged on the distributor unit.

4. The flow regulator of claim 3, characterized in that the distributor unit has a distributor disc with flow apertures distributed substantially evenly over its surface.

5. The flow regulator of claim 4, characterized in that said distributor unit comprises screen means behind the disc in the direction of flow and spaced therefrom.

6. The flow regulator of claim 5, characterized in that the housing has apertures between the distributor disc and the screen arrangement.

7. The flow regulator of claim 6, characterized in that axial spacers are provided on the distributor disc.

8. The flow regulator of claim 7, characterized in that the distributor unit has a substantially cylindrical collar extending around an outer edge thereof for holding said perforated disc and said regulating unit.

9. The flow regulator of claim 8, characterized in that pins equal in number to the holes in the perforated disc and aligned with those holes are arranged on the distributor disc.

10. The flow regulator of claim 9, characterized in that the maximum length of the pins is equal to the axial length of a projection on the inside of the collar, and that the ledge formed by the projection acts as a spacer for the perforated disc.

11. The flow regulator of claim 10, characterized in that the perforated disc is mounted with axial clearance between the distributor unit and the regulating unit.

12. The flow regulator of claim 11, characterized in that the perforated disc can yield resiliently to the flow pressure exerted, at least in its central portion in which at least one hole is provided.

13. The flow regulator of claim 12, characterized in that the axial clearance or deflection of the perforated disc in the region of the hole is at least 0.5 mm at a flow pressure of 3 bar.

14. The flow regulator of claim 1, characterized in that said regulating unit comprises a plastic cone provided with a central aperture and slots extending radially outwardly from the aperture and ending before the periphery of the regulating unit, and that the tapering end of the cone points in the opposite direction to the direction of flow.

15. The flow regulator of claim 14, characterized in that an annular flange is provided at the outer edge of the cone.

16. The flow regulator of claim 15, characterized in that the distributor unit has a screen arrangement, comprising at least two fine screens and two coarse screens which are at least partly spaced from each other.

17. A fluid flow regulator comprising a housing;
a regulating unit mounted inside said housing and including a plastic cone tapering in the direction opposite the flow direction of a fluid flowing therethrough, said cone being provided with a central aperture and a plurality of slots extending radially outward from said aperture and ending before the periphery thereof for changing the free flow area of said regulating unit depending upon the pressure of said fluid;

a distributor unit mounted in said housing downstream from said regulating unit; and a disc provided with a hole and mounted between said regulating unit and said distributor unit in a manner affording axial moveability thereof at least in the region of said hole.

18. A fluid flow regulator according to claim 17 further comprising pin means mounted downstream from said hole and in axial alignment therewith for variably restricting fluid flow in response to movement of said disc.

* * * * *